(12) United States Patent
Tsai

(10) Patent No.: US 6,499,705 B1
(45) Date of Patent: Dec. 31, 2002

(54) MULTI-PURPOSE SUPPORTING STRUCTURE

(76) Inventor: Ming-Liang Tsai, 4F-3, No. 8, Fu Ching St., Taipei (TW)

(*) Notice: Subject to any disclaimer, the term of this patent is extended or adjusted under 35 U.S.C. 154(b) by 0 days.

(21) Appl. No.: 10/035,425

(22) Filed: Jan. 4, 2002

(51) Int. Cl.[7] ............................................... F16M 11/38
(52) U.S. Cl. ...................... 248/167; 211/200; 248/168; 248/188.6
(58) Field of Search ................................. 248/166, 167, 248/168, 173, 150, 151, 188.6; 211/200

(56) References Cited

U.S. PATENT DOCUMENTS 3,381,926 A * 5/1968 Berry ...................... 248/188.6
RE31,641 E * 8/1984 Derus ...................... 248/166 X
5,645,259 A * 7/1997 Chen .................... 248/188.6 X

* cited by examiner

Primary Examiner—Ramon O. Ramirez
(74) Attorney, Agent, or Firm—Rosenberg, Klein & Lee

(57) ABSTRACT

A multi-purpose support structure comprises at least four retractable erection tubes and a set of two scissors type connecting rods provided between two abutted erection tubes alternatively pivoted at their centers with the upper and the lower ends of each erection tube being pivoted to the cross connecting rods to form a rectangular frame, the frame may be connected to another one by means of T-shaped pivoting holders to incorporate fixing members to hold in position a piece of canvas on the top surface of the frame or insertion of a container to provide a rack or an accommodation space to receive objects.

2 Claims, 9 Drawing Sheets

MULTI-PURPOSE SUPPORTING STRUCTURE

BACKGROUND OF THE INVENTION (a) Field of the Invention

The present invention relates to a multi-purpose support structure, and more particularly, to one that expands for multiple applications, readily extendable both in width and length by combination with minimum derived members, and foldable for saving storage space.

(b) Description of the Prior Art

Whereas appliances for daily use are compact and multi-purpose designed nowadays to facilitate storage or be readily for conversion to another type of combined use, multi-purpose oriented design has become one of the important means for market expansion to offer agile and diversified optional functions for soliciting the buying urge among the consumers. Accordingly, KD cabinets and racks are available in the market. Usually, those cabinets and racks are essentially comprised of multiples of supports erected into a structure of one or more than one level and then fastened or placement of soft fabrics for accommodation of objects, and dismantled when not used. Said KD structure allows reduced packaging for transportation and sales. However, most of those supports are related to tubes for alternative and cross insertion. Those tubes can be disconnected for storage, but they must be fastened into bundles or bagged. Besides, it consumes too much time for erection.

SUMMARY OF THE INVENTION

The primary purpose of the present invention is to provide a multi-purpose support structure that is expandable for multiple applications, extendable both in width and length when combined with the minimum derived members, and foldable for storage without knocking down the members. To achieve the purpose, at least four retractable erection tubes with each two abutted erection tubes pivoted each at its both ends to two connecting rods in cross to form a rectangular frame. Wherein, said two cross connecting rods are alternatively pivoted at their centers. Each of said erection tube is composed of an inner tube inserted into an outer tube to become retractable. A pivoting holder is each provided at the upper and the lower top of each rod. An insertion hole is formed at the center of the pivoting holder and two side slots are formed to the pivoting holder to allow the insertion of the upper and the lower ends of two abutted cross connecting rods. Accordingly, while said connecting rods are expanded, the erection tubes stretch outward and reduce longitudinally in dimension to form the rectangular frame. A top surface defined by those upper pivoting holders of the rectangular frame is incorporated with fixing elements to hold a pavement of canvas or similar material, or a container being inserted into the inner space defined by the rectangular frame to become a unit functioning as a support structure for a rack or a container.

Another purpose of the present invention is to provide a multi-purpose support structure that is expandable both in width and length without limitation. To achieve the purpose, a T-shaped pivoting holder containing a three-way trough connected to both ends of each erection tube for the trough to be located between two erection tubes from the outer frame and connected to sets of cross connecting rods for expansion. The central trough of the T-shaped pivoting holder can be further pivoted to longitudinally provided cross connecting rods for segregation and reinforcement purposes in enlarging the volume available by stretching up the support structure. Accordingly, a longer support structure is provided with top surface placed with multiple pieces of canvas to form a camp bed if required.

DETAILED DESCRIPTION OF THE PREFERRED EMBODIMENTS

Figure 1:
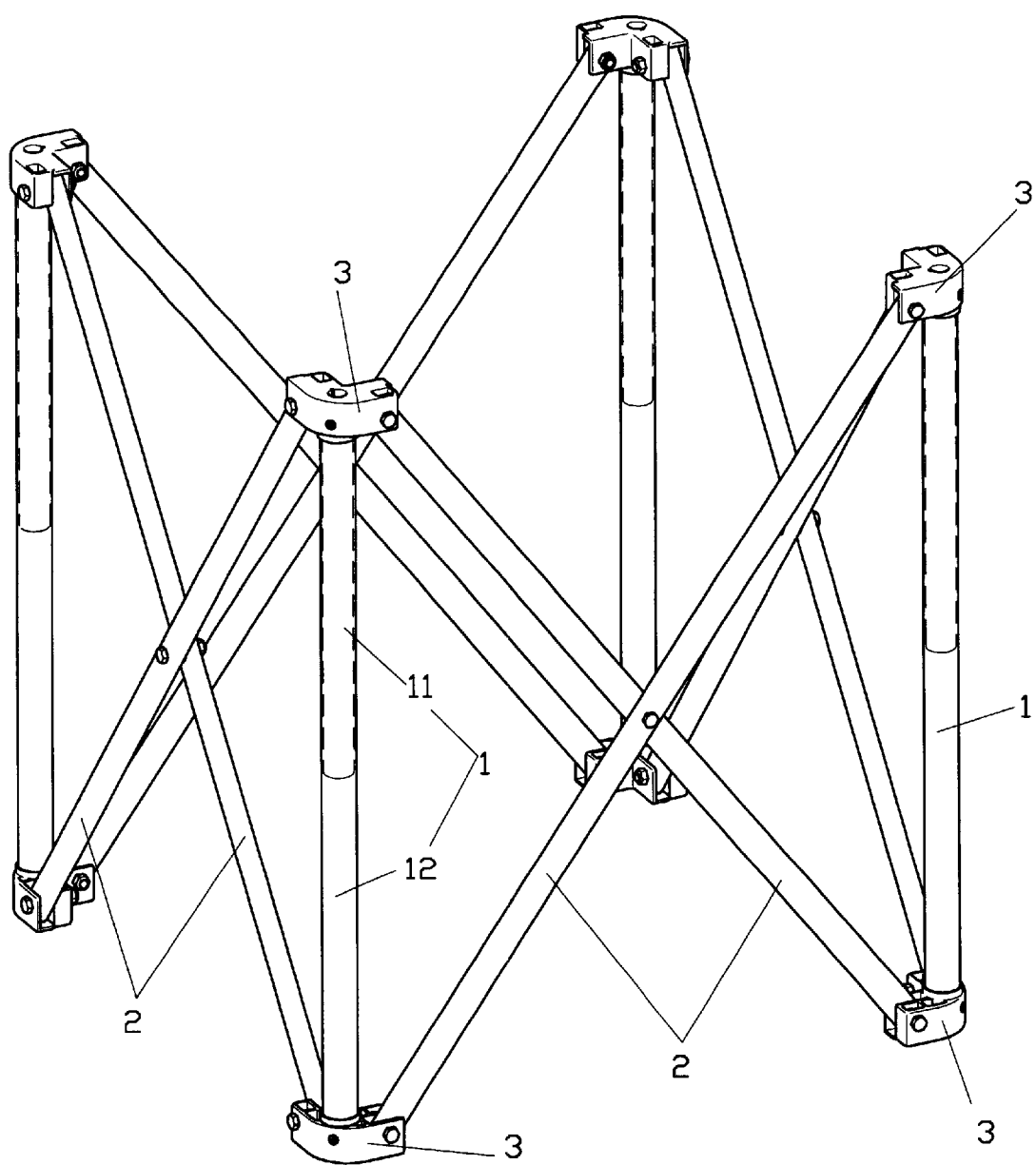
FIG. 1 is a perspective view of a structure of the present invention.
Figure 2:
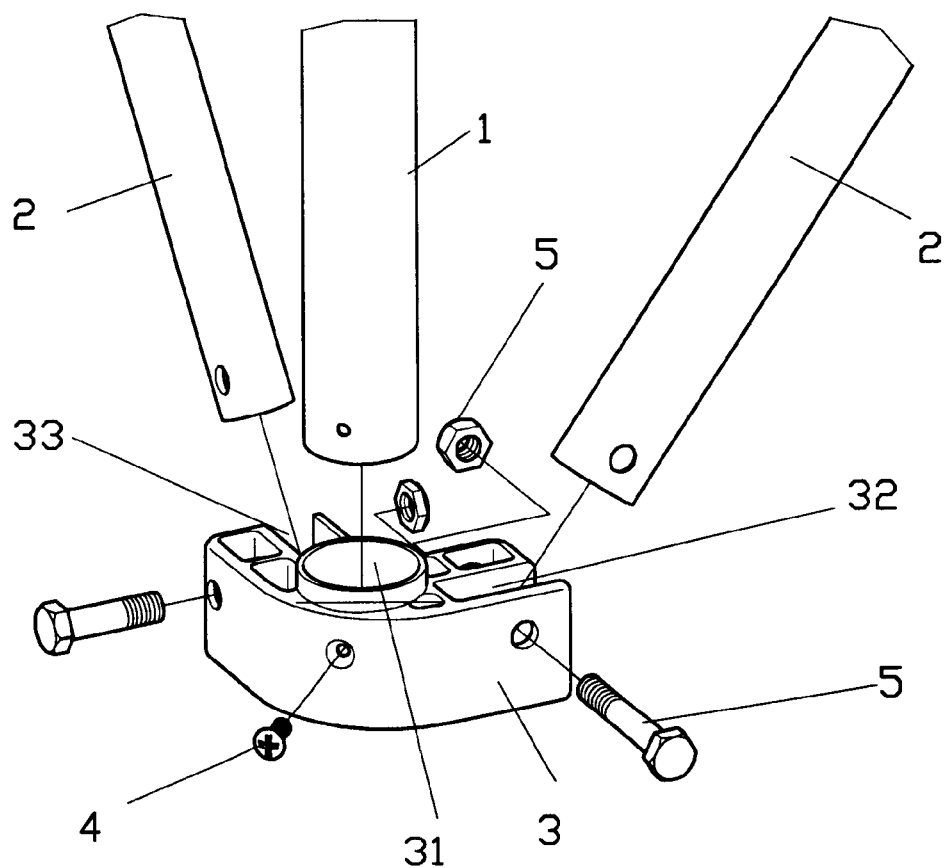
FIG. 2 is an exploded view of a localized structure of the present invention.

Referring to FIG. 1, a support structure of the present invention essentially comprises four retractable erection tubes (1) alternatively pivoted between two abutted erection tubes (1) to a pair of scissors connecting rods (2) alternatively pivoted at their centers with each of said erection tubes (1) relatively pivoted to the upper and the lower ends of the connecting rod (2) to form a rectangular frame. Wherein, said erection tube (1) is composed of an inner tube (11) inserted into an outer tube (12) to allow the erection tube (1) to be retractable. Also referring to FIG. 2, both of the upper and the lower ends of the erection tube (1) is respectively provided with an L-shaped pivoting holder (3) having an insertion hole (31) to receive for the erection tube (1) with a screw (4) to lock into position. Both ends on inner side to the pivoting holder (3) are respectively formed with two troughs (32, 33). Said troughs (32, 33) receive insertion of the upper and the lower ends of the cross connecting rod (2) on both sides of the erection tube (1) by means of a set of bolting member 5.

Figure 3:
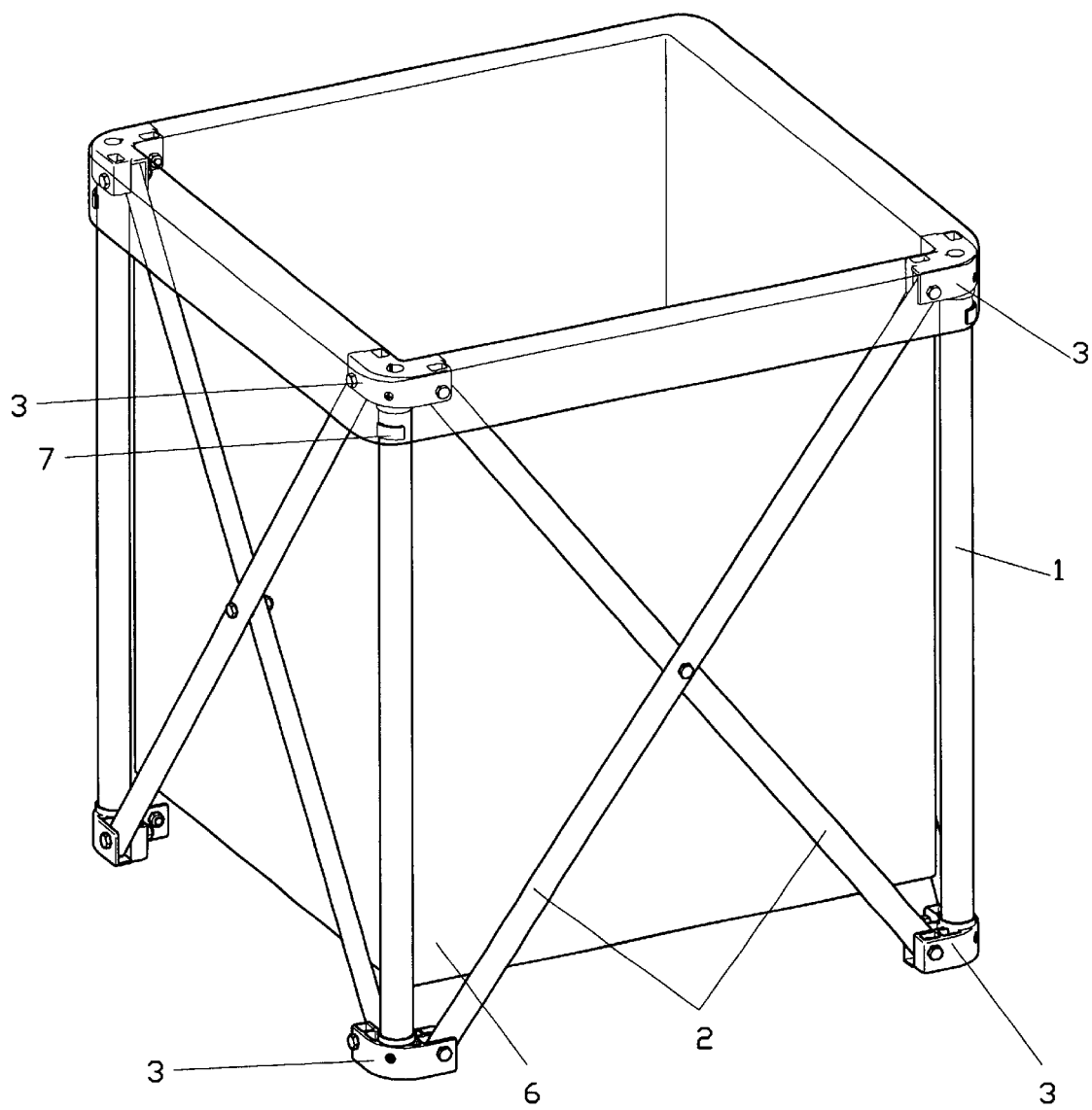
FIG. 3 is a perspective view showing that the present invention is adapted to a container.

As illustrated in FIG. 1, when the four sets of cross connecting rods (2) expand, the four erection tubes (1) also expand outward, and reduce its longitudinal height to allow the inner tubes (11) to fully retreat into the outer tubes (12) to form a stable support structure. Therefore, the four erection tubes (1) and four sets of cross connecting rods (2) form a rectangular frame in conjunction with eight pivoting holders (3). As illustrated in FIG. 3, a volume defined inside the rectangular frame accommodate a container (6) with its upper edges flush with the top of the rectangular frame and is fixed in position by a magic tape (7) or similar fixing member.

Figure 4:
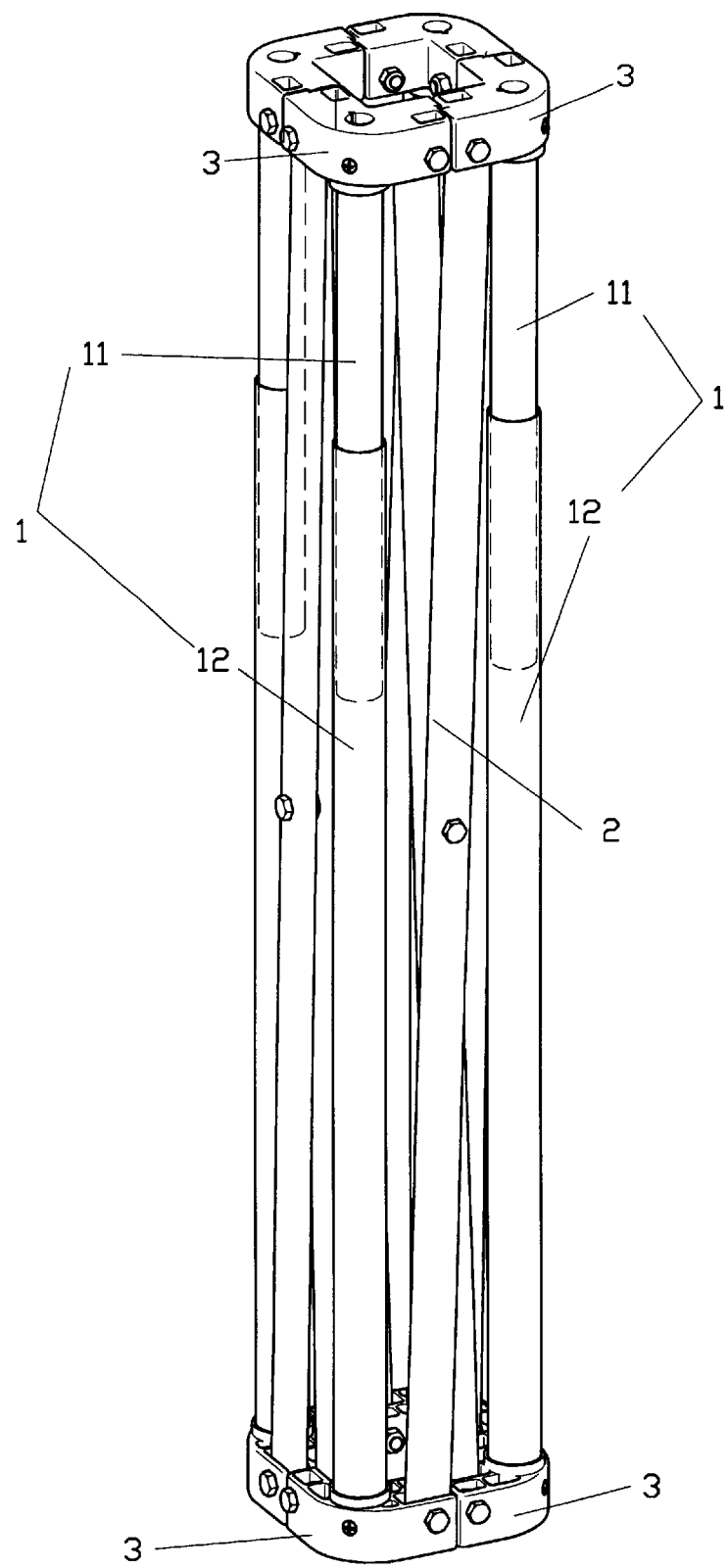
FIG. 4 is a perspective view showing that the present invention is folded for storage.

When the four sets of cross connecting rods (2) are folded as illustrated in FIG. 4, the four erection tubes (1) retreat inward at the same time while longitudinally extending for an extra length to allow the four upper pivoting holders (3) and another four lower pivoting holders (3) to respectively form a square frame. The four sets of cross connecting rods (2) and four erection tubes (1) also rest against one another to significantly reduce the size of the support structure though with a slight increase in length.

Figure 5:
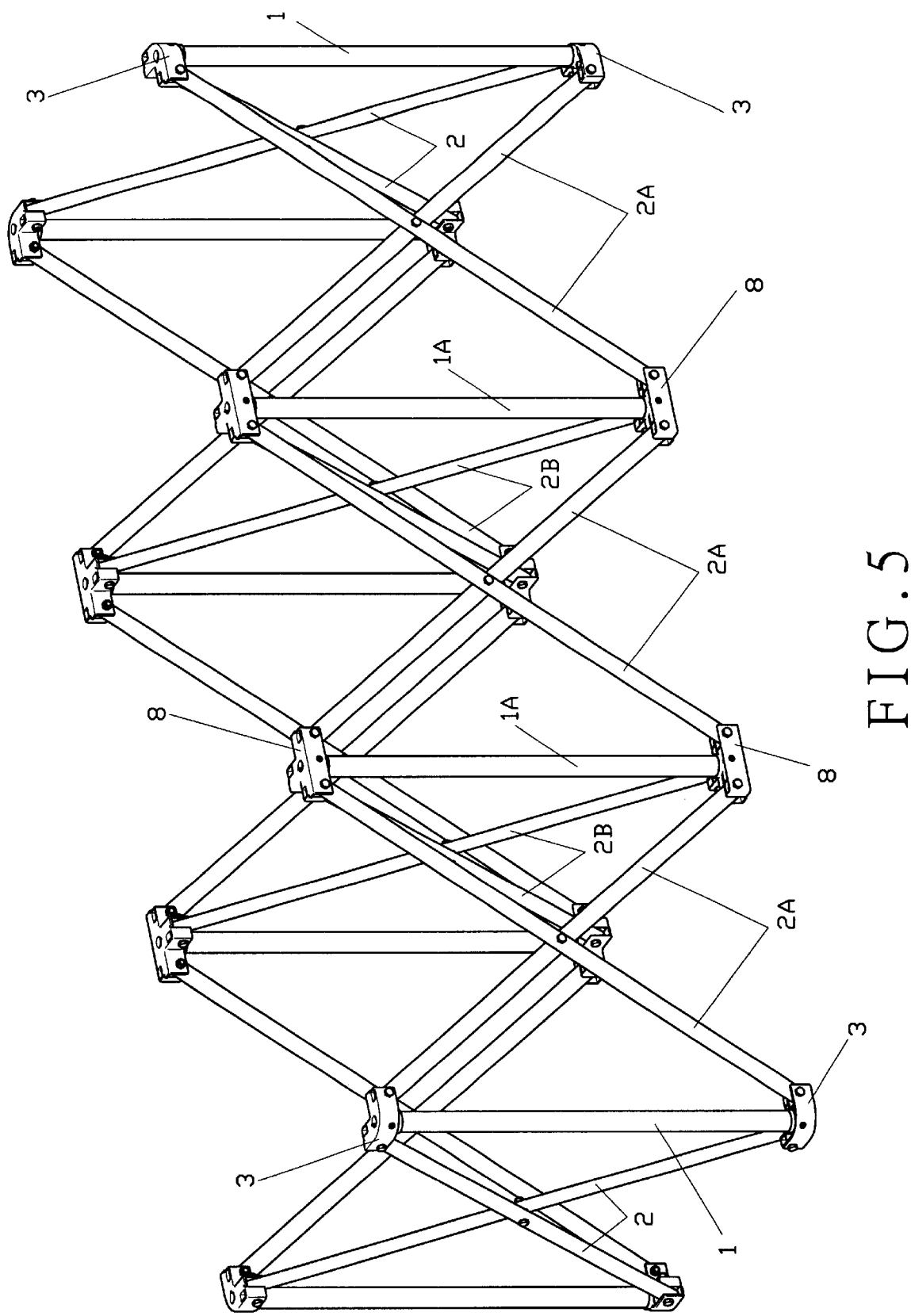
FIG. 5 is a perspective view showing a preferred embodiment with extended length of the present invention.
Figure 6:
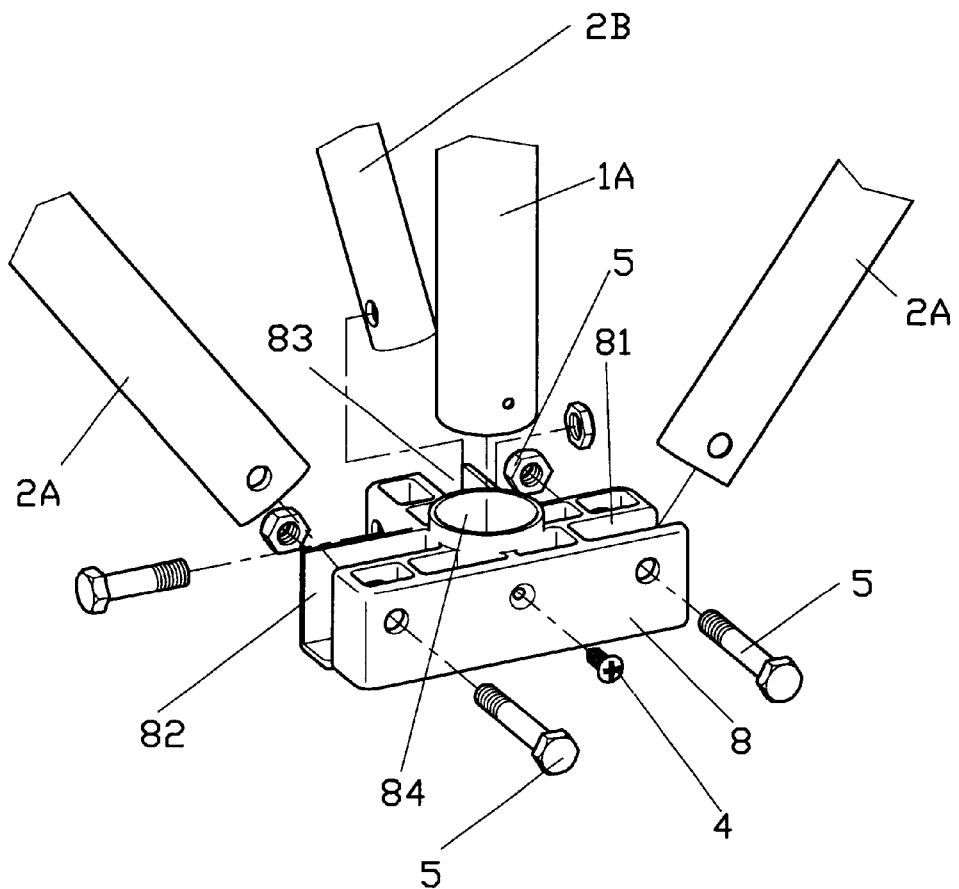
FIG. 6 is an exploded view of a localized part of the preferred embodiment with extended length of the present invention.
Figure 7:
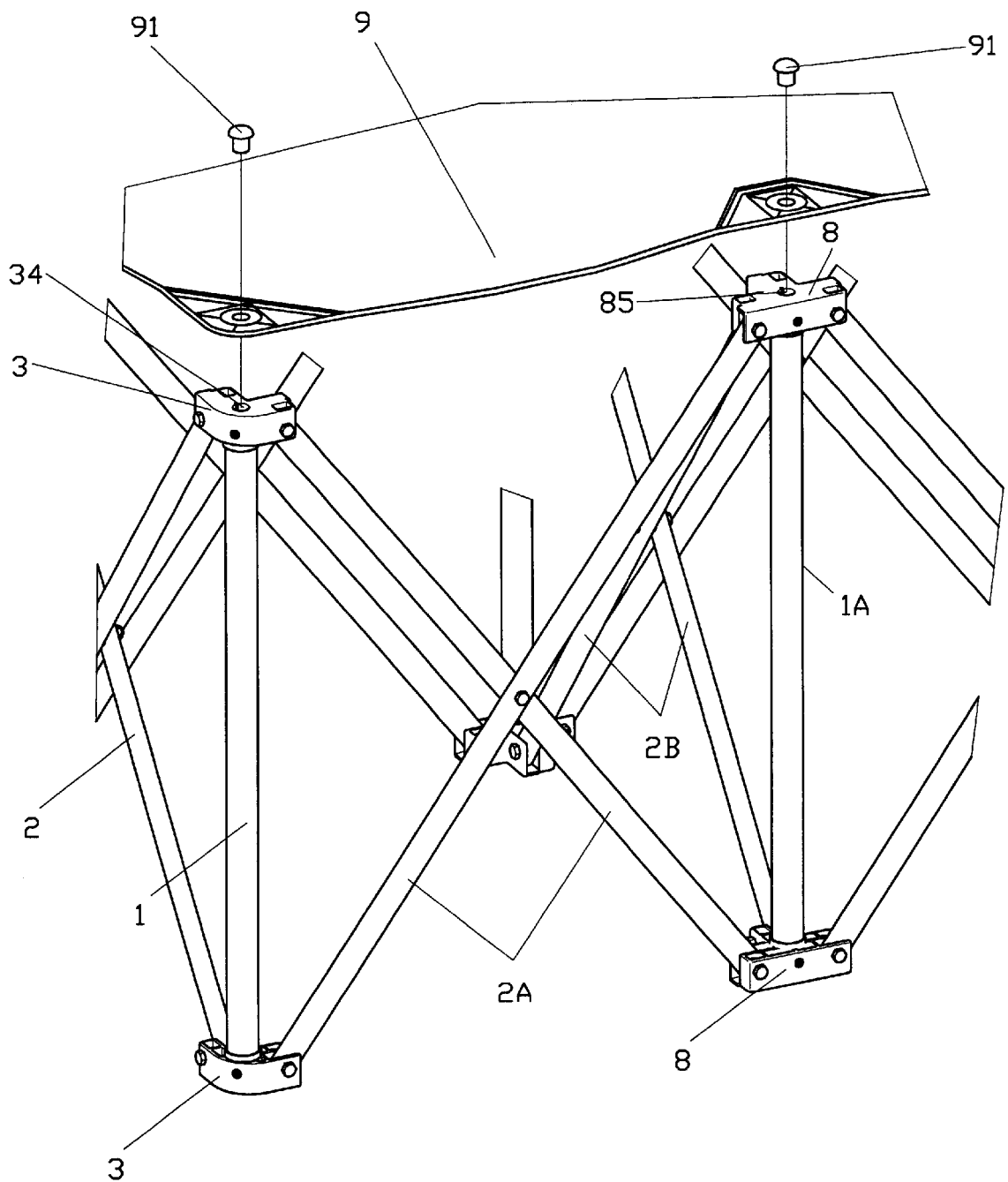
FIG. 7 is a perspective view of a structure of the extended preferred embodiment paved at its top a canvas.
Figure 8:
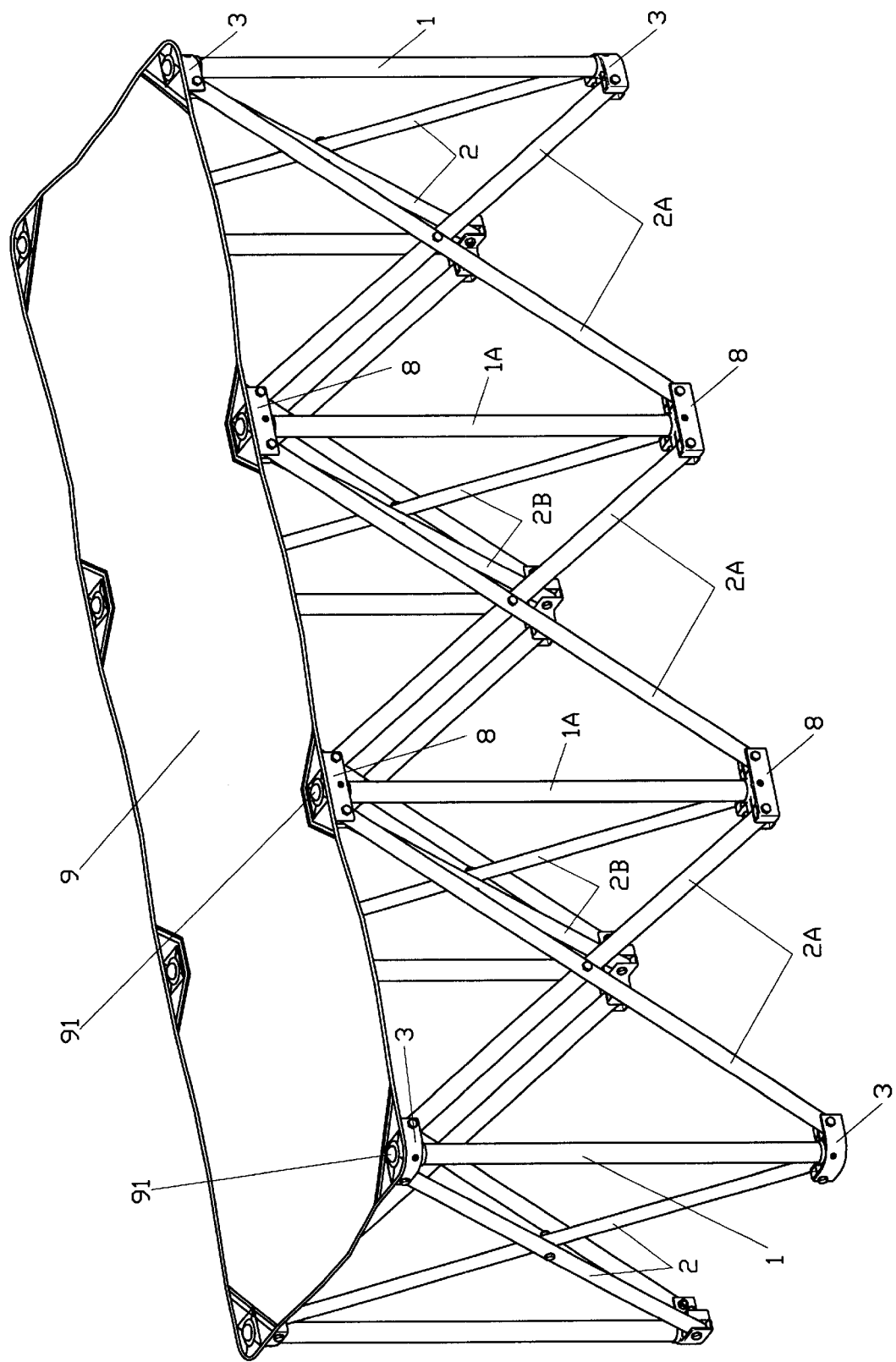
FIG. 8 is a perspective view of a combination of the extended preferred embodiment paved with canvas.
Figure 9:
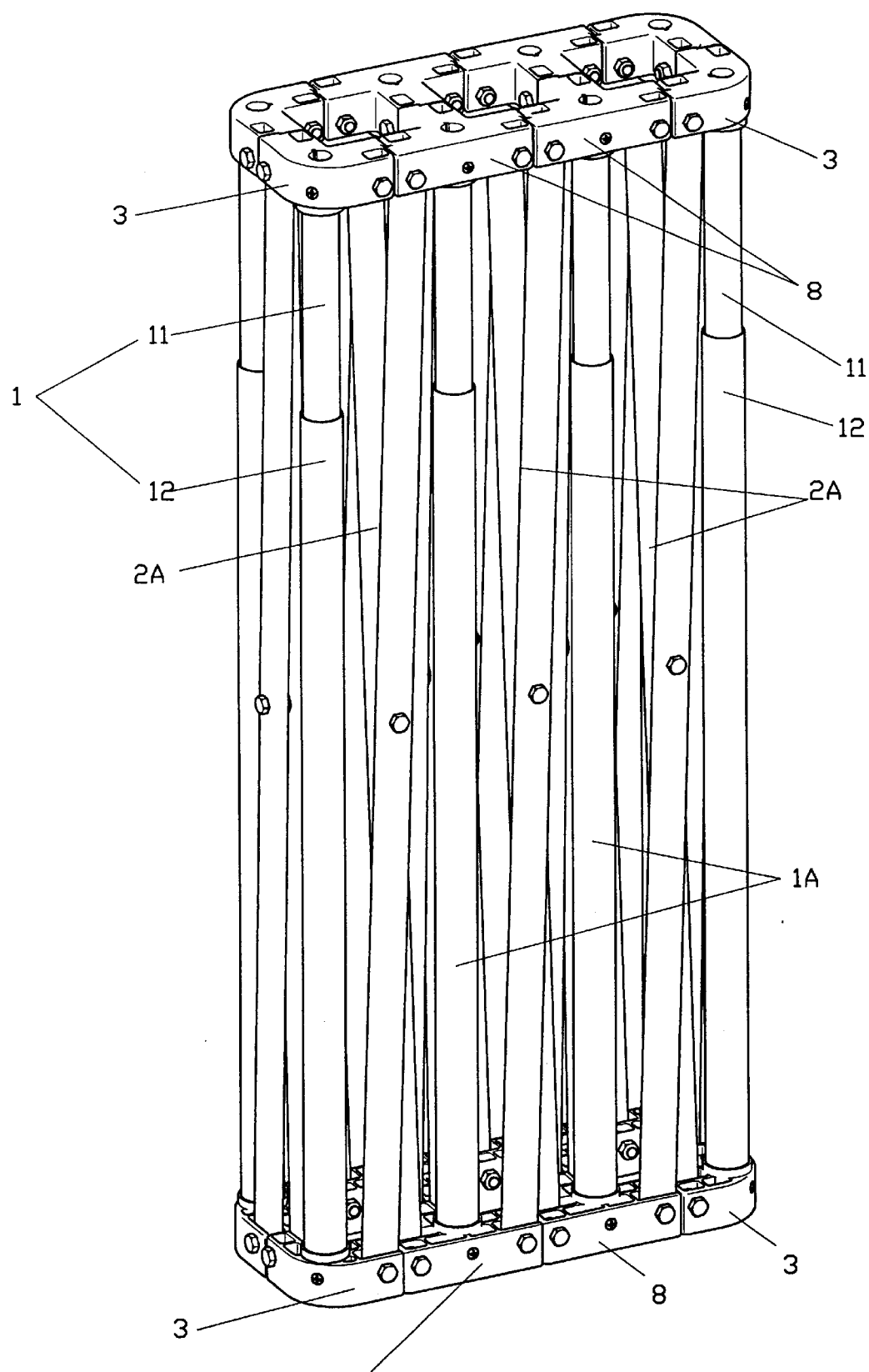
FIG. 9 is a perspective view showing the extended preferred embodiment is folded for storage.

Referring to FIGS. 5 and 6, a T-shaped pivoting holder (8) having three-way troughs (81, 82, 82) is provided between two erection tubes (1) on the outer side frames. The upper and the lower ends of an additional erection tube (1A) are inserted into a center insertion hole (84) in the T-shaped pivoting holder (8) and locked into position by means of the screw (4). Meanwhile, both side troughs (81, 82) of the T-shaped pivoting holder (8) are connected to two sets of additional cross connecting rods (2A) with either set of the connecting rod (2A) to be further connected to another set of connecting rod combined with the T-shaped pivoting holder (8) on the other side, and connected even further to the erection rod (1) provided on the outer side frame for extending in length by fold. The central trough (83) of the T-shaped pivoting holder (8) is used to pivot to longitudinally arranged cross connecting rod (2B) for segregation and reinforcement purposes to the support structure. Accordingly, by expanding the multiple sets of cross connecting rods (2, 2A, 2B), the multiple sets of erection tubes (1, 1A) expand outward with reduced height to form an expanded standing rectangular frame with an enlarged volume. As illustrated in FIGS. 7 and 8, a recess (34, 85) is each bored on the top of each L-shaped pivoting holder (3) and the T-shaped pivoting holder (8) to allow incorporation of a buckling type of fixing member (91) for fixing into position a piece of canvas (9) paved on the top surface defined by the rectangular frame. By extending the rectangular frame with its top paved with canvas (9), a camp bed. Similarly, the enlarged rectangular frame can be folded for reduced size as illustrated in FIG. 9 with or without the canvas provided the canvas is soft enough.

I claim:

1. A multi-purpose support structure comprising six or more than six retractable erection tubes and a set of two scissors type connecting rods provided between two abutted erection tubes alternatively pivoted at their centers with the upper and the lower ends of each erection tube being pivoted to the cross connecting rods to form a rectangular frame characterized by that:

each erection tube being retractable by having an inner tube inserted into an outer tube, one L-shaped pivoting holder being each provided to the upper and the lower ends of the erection tube, the L-shaped pivoting holder each provided at the four erection tubes on the outer frame having at its center an insertion hole to receive and hold the corresponding erection tube in position, two troughs formed on both ends to the inner side of the L-shaped pivoting holder for receiving insertion by the upper and the lower ends of each of the connecting rods provided on the abutted sides, a T-shaped pivoting holder having three-way troughs being provided between two erection tubes on the outer frame to be connected to two sets of cross connecting rods on both sides, both sets of cross connecting rods on the other side being connected to the erection tubes on the outer side of the frame or to another set of frame incorporated with another T-shaped pivoting holder, and the central trough of the T-shaped pivoting holder being used to pivot longitudinally arranged cross connecting rods for the multiple sets of erection tubes to expand with a reduced height along with that by the cross connecting rods for the formation of the rectangular frame.

2. A multi-purpose support structure as claimed in claim 1, wherein, bores are provided in the upper T-shaped pivoting holders of the expanded rectangular frame to incorporate fixing members to hold in position a piece of canvas on the top surface of the frame or for placement of a container to provide a rack or an accommodation space to receive objects.

* * * * *